June 11, 1935.  R. RIEGLER  2,004,586
RECOVERY OF VAPOR PHASE OXIDATION PRODUCTS AND APPARATUS THEREFOR
Filed May 20, 1931
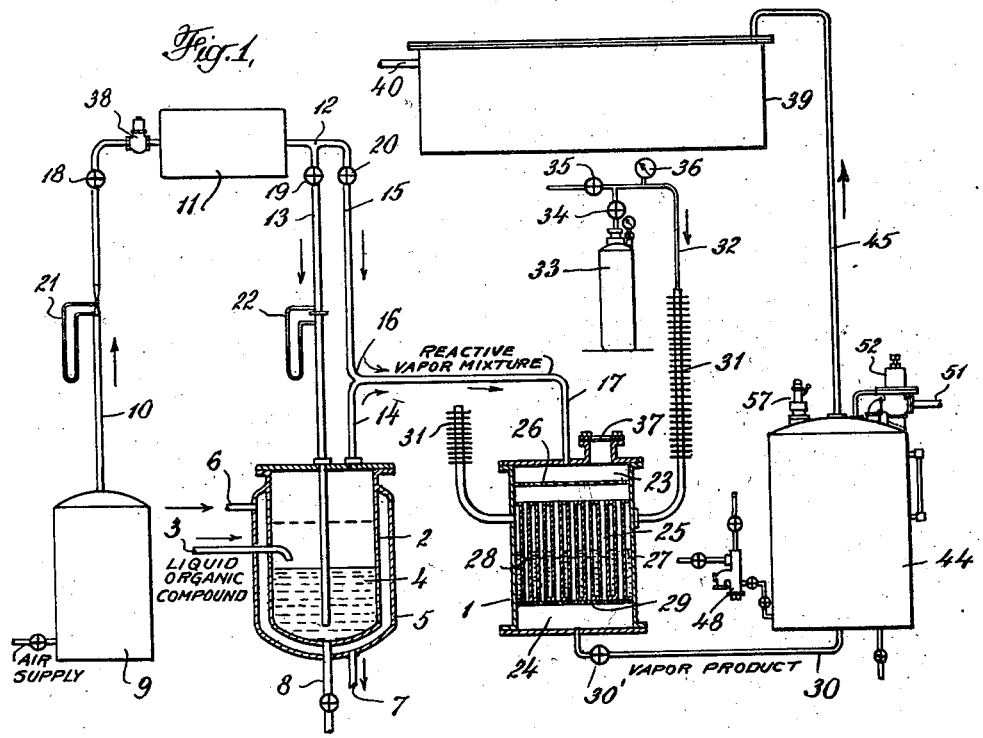
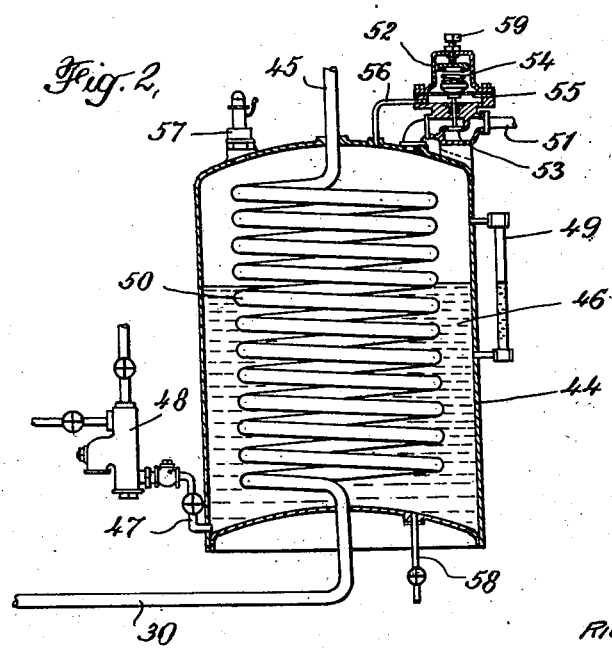
INVENTOR
Riewen Riegler
BY
ATTORNEY Patented June 11, 1935

2,004,586

UNITED STATES PATENT OFFICE 2,004,586

RECOVERY OF VAPOR PHASE OXIDATION PRODUCTS AND APPARATUS THEREFOR

Riewen Riegler, Buffalo, N. Y., assignor to National Aniline & Chemical Company, Inc., New York, N. Y., a corporation of New York Application May 20, 1931, Serial No. 538,766

8 Claims. (Cl. 260—123)

This invention relates to the manufacture of organic products, particularly those which are formed in the vapor state or phase, and has for its object the provision of improvements in the manufacture of such products. More especially the invention relates to improvements in the recovery of products from the vapor mixture resulting from the partial oxidation of organic compounds in the vapor phase at elevated temperatures in the presence of a catalyst, and particularly to the recovery of those products which precipitate from such vapor mixture directly as solids, and apparatus therefor.

Although the invention is directed primarily to the vapor phase partial oxidation of naphthalene to phthalic anhydride, it may also be used in the vapor phase partial oxidation of anthracene to anthraquinone, phenanthrene to phenanthrone, fluorene to fluorenone, naphthalene to naphthaquinone, benzene to benzoquinone, maleic acid and/or anhydride, acenaphthene to naphthalic anhydride, and toluene to benzoic acid.

In the manufacture of organic chemical products by the catalytic partial oxidation of organic compounds in the vapor phase, in accordance with one method of procedure, the organic compound is vaporized, the vapors are mixed with an oxidizing gas, and the mixture is passed in contact with a suitable oxidation catalyst contained in a catalyst chamber, or converter, while being maintained under controlled conditions of temperature and pressure.

As generally carried out in practice, the reacted mixture of vapors leaving the catalyst chamber, or converter, contains a relatively small amount of the desired oxidation product in admixture with a relatively large amount of residual gases and is at an elevated temperature which lies considerably above the dew-point of the desired product. In order to recover the desired product, the reacted mixture is passed through a large air-cooled condenser which reduces the temperature of the mixture to the dew-point of the desired product, thereby causing it to condense.

For efficient operation, it is desirable that the reacted vapor mixture enter the condenser at a temperature corresponding substantially with the dew-point of the desired product. For, if the temperature of the vapor mixture is too high, when the desired product is a substance which separates as a solid (as for example, phthalic anhydride or anthraquinone) the product is apt to separate as a molten liquid instead of a crystalline solid and subsequently solidify on the walls of the condenser as a hard cake which is not only less pure than the crystalline product, but also is extremely difficult to remove. On the other hand, if the temperature of the vapor mixture falls too low while being conducted from the converter to the condenser, the product is apt to separate in the conducting pipe lines and interfere with, or even completely interrupt, the free flow of vapor mixture through said lines.

It is a difficult problem to control the temperature of the condenser in such a manner as to secure efficient operation. The necessarily large size of the condenser, the inevitable fluctuation in the rate at which the mixture of vapors and gases enters the condenser, the necessary variation in the operating temperature of the converter, and the fluctuation of the temperature of the mixture leaving the converter, even when maintaining the converter in operation at as nearly a constant temperature as possible, all contribute to make it difficult to maintain the condenser at constant temperature.

The present invention aims to overcome these difficulties, through the exercise of control over the cooling of the vaporous mixture before it enters the condenser. More particularly, in accordance with the invention, the vaporous mixture leaving the converter is cooled to a regulated constant temperature just above the dew-point of the desired product before entering the condenser. As a result, condensation commences promptly within the condenser, and the temperature of the condenser remains approximately constant so long as the rate of feed to the condenser does not fluctuate too much, and even though there is a variation in the operating temperature of the converter or a wide fluctuation in the temperature of the vaporous reacted mixture leaving the converter.

In the manufacture of partial oxidation products which precipitate directly as solids from the vaporous or gaseous reacted mixture, as for example in the gas phase partial oxidation of naphthalene to phthalic anhydride and of anthracene to anthraquinone, prevention of the condensation of the desired partial oxidation product in molten form is an important consideration from the standpoint of the practical operation of a plant, and it is an object of the present invention to provide a process whereby the partially oxidized product is precipitated in the form of crystals of a high degree of purity which accumulate in the condenser and are readily removed at suitable intervals by means of a shovel or otherwise.

In order to secure the most favorable operating conditions as regards the yield and the quality of the desired partially oxidized product, the mixture of gases and vapors undergoing reaction in the converter is maintained under a suitable pressure. This pressure varies from 1 to 2 lbs. to 20 to 40 lbs. or more above atmospheric pressure, and is usually in the neighborhood of 20 to 30 lbs. above atmospheric pressure. It is desirable that this pressure be maintained as nearly constant as possible, and accordingly it is another object of the present invention, from the standpoint of practical commercial operation of a plant, to provide a process which will substantially prevent the precipitation of the desired partially oxidized product in the pipe lines connecting the converter and the condenser.

In carrying out the invention, a vapor mixture of the organic compound and an oxidizing gas is subjected to an oxidizing action, such for example as the action of an oxidation catalyst under controlled reaction conditions adapted to produce a partial oxidation of the organic compound. The gaseous reacted mixture thus produced contains the desired partially oxidized product, usually mixed with the vapors of other products of partial oxidation, and in certain instances some unchanged organic compound in the vapor state. This vaporous mixture is precooled to a regulated constant temperature, said temperature being preferably just above the dew-point of the desired partially oxidized product, and then subjected to condensation.

The dew-point of a vaporous mixture with respect to any product contained therein is that temperature at which said product begins to precipitate from the vapor phase to the solid or liquid phase. This dew-point depends upon various factors, such as the nature of the organic material, and the nature of the gas mixture, as well as the ratio of the material to the gas mixture. In the manufacture of phthalic anhydride by the vapor phase oxidation of naphthalene, the dew-point of the reacted vaporous mixture with respect to the phthalic anhydride contained therein varies with the air to naphthalene ratio used in the initial reaction mixture, the dew-point temperature in practice being in the neighborhood of about 115° C. to 130° C.

The vaporous mixture is preferably precooled to a temperature as close to its dew-point with respect to the desired partial oxidation product as is operatively feasible, without causing a substantial condensation of said partial oxidation product, for if substantial condensation occurs, the conduit between the cooler and the condenser will become filled with the solid material, thus raising the pressure upon the vapor undergoing reaction in the converter above the desired value. To illustrate, in the manufacture of phthalic anhydride by the vapor phase partial oxidation of naphthalene with air by means of a vanadiumoxide catalyst, the gaseous reaction mixture is cooled to a temperature between the dew-point of the phthalic anhydride in the mixture, and a temperature preferably about 1° to 3° C. above said dew-point.

The temperature of the gaseous reacted mixture leaving the zone of oxidation reaction depends upon the nature of the organic compound acted upon (for example naphthalene, anthracene or benzene, etc.), the ratio of the oxidizing gas to the organic compound, the amount of catalyst, the activity of the catalyst, the kind of catalyst carrier, and the time of contact. In the case of phthalic anhydride, for example, the reaction temperature of the naphthalene vapor and air mixture, with the commercial ratios of said materials usually employed, is in the neighborhood of between 375° C. and about 600° C.

In order to cool the vaporous reacted mixture from the elevated temperatures mentioned above to a temperature preferably about 1° to 3° C. above its dew-point with respect to the desired product (in this case phthalic anhydride, which, as previously mentioned, is in the neighborhood of about 115° C. to 130° C.) not only must a large amount of heat be removed from the vapors, but extraordinary precautions must be taken, under preferred operating conditions, to prevent the cooling of these gases to a point below the dew-point, or to a point too high above the dew-point. This is accomplished in accordance with a preferred embodiment of the invention, by bringing the gaseous mixture, after it leaves the reaction zone, and before it is subjected to the condensation, into heat exchanging relation with the liquid phase of a two-phase liquid-vapor system, the pressure of the vapor produced in said system being maintained constant. In this way the heat contained in the gaseous mixture is removed as latent heat of vaporization of the liquid in the two-phase liquid-vapor system. Moreover, the temperature of vaporization of the liquid in this system may be regulated by controlling the pressure upon the vapor of this system. Hence the gaseous mixture is cooled to the temperature of vaporization of the liquid in the two-phase system, but cannot be cooled below this temperature since the temperature of a liquid and its vapor is always the same as long as the two are in contact and the liquid is boiling under constant pressure.

The liquid used in the system may be any liquid which, under the conditions of pressure employed, has a boiling point below the temperature of the entering vaporous mixture which is to be cooled but which will boil at the temperature to which the vaporous mixture is to be cooled. For practical purposes the liquid employed in the system is one which does not require unduly high pressures to keep its boiling point at or within the range of temperature to which the vaporous mixture is to be cooled. Ordinarily, water is the liquid employed since it is cheap and has a boiling point below the temperature of most, if not all, gases leaving a catalytic converter and, further, pressures not unduly high can be employed to maintain its boiling point at temperatures to which it is desired in most cases, to cool the exit converter gases.

The gaseous reacted mixture cooled to a regulated constant temperature, preferably just above the dew-point of the desired partial oxidation product, as just described, is immediately subjected to condensation in any suitable apparatus, for example, by passing the mixture into a large air-cooled chamber. The product begins to precipitate or condense almost immediately upon entering the condenser, and the desired product, such for example as phthalic anhydride, will separate and accumulate in crystalline form; that is, in long needle-like crystals. The uncondensible gases and other uncondensed products pass out of the condenser through a suitable opening.

A fuller understanding of the invention may be had through a study of the accompanying drawing and following description illustrating the process of the invention as applied, for example, to the manufacture of phthalic anhydride by the gas phase partial oxidation of naphthalene, in connection with an illustrative embodiment of the apparatus of the invention.

In this drawing:

Figure 1 is a view showing diagrammatically the arrangement of the apparatus, and Figure 2 is a vertical section taken centrally through the vapor cooler.

Referring now to this drawing, the partial oxidation of the organic compound takes place in the converter 1, and a brief description of the preparation of the vaporous mixture of the organic compound and oxygen-containing gas for introduction into the converter will first be given. Where the organic compound is solid at ordinary temperatures, such for example as naphthalene, it is melted and run into a vaporizer 2 through the inlet pipe 3, and a body of molten naphthalene 4 is maintained at about the level indicated. The vaporizer is surrounded by a heating jacket 5 which may be conveniently heated by means of steam introduced at the inlet 6 and leaving by the outlet 7. A valved pipe 8 is provided for draining the vaporizer chamber when desired.

Air is a suitable oxygen-containing gas, and a supply of air under suitable pressure is maintained in the receiver 9. The air is led through line 10 and preheater 11 to a branch or T 12 where the air divides, a portion of it passing through line 13 the lower end of which extends below the surface of the body of molten naphthalene 4 in the vaporizer. This air bubbles up through the molten naphthalene and becomes saturated with naphthalene vapor and then leaves the vaporizer through line 14.

Another line 15 leads from T 12 and joins vapor line 14 at 16 whereby the saturated vapor from the vaporizer is diluted with air (as more fully described and claimed in my copending application Serial No. 350,524, filed March 28, 1929) so as to provide a suitable reactive vapor mixture which enters the top of the converter through line 17. If desired, a mixing device, such as a plug having a helical passage through it, may be included in the line 17 to effect more complete intermixing of the vapor mixture and diluting air. Valves 18, 19 and 20 respectively in lines 10, 13 and 15 are provided for appropriately controlling the flow of air to the vaporizer and also the flow of the diluted air. By adjusting these valves and observing the readings of the meters 21 and 22 which are placed respectively in lines 10 and 13, the ratio of air to naphthalene in the reactive vapor mixture entering the converter through line 17 may be accurately regulated.

The converter 1 consists of a steel shell having an inlet compartment 23 at the top and an outlet compartment 24 at the bottom, and provided between these two compartments with a bundle of closely spaced thin-walled tubes 25. The reactive vapor mixture enters inlet chamber 23 through line 17 and is distributed to the upper ends of the tubes 25. A screen 26 preferably placed in chamber 23 aids in obtaining a uniform distribution of the vapor mixture to all the tubes.

The spaces within the converter shell surrounding the tubes 25 are filled to a level indicated at 27 with a liquid (preferably mercury) which boils at about the temperature of the reaction.

The tubes 25 are filled with catalyst, for example vanadium oxide coated on a suitable carrier, up to a level indicated at 28, just below the level of the temperature controlling liquid. This catalyst is a granular material and may be conveniently supported by means of a screen 29 placed adjacent the bottom ends of tubes 25.

The converter is heated in a convenient manner, not shown, at the commencement of its operation, after which the heat of the reaction is more than sufficient to maintain it in operation. Assuming that the converter is in operation, the incoming reactive vapor mixture is heated in the upper ends of the tubes 25 above the catalyst, and by the time it enters the catalyst it is at the reaction temperature. Then in passing down through the catalyst the reaction takes place, that is, the partial oxidation of the naphthalene to phthalic anhydride, and the partially oxidized product, namely phthalic anhydride vapor, together with some unchanged air and, as impurities, some unchanged naphthlene vapor and/or vapors of other products of partial oxidation, passes into the outlet chamber 24 and is led therefrom by line 30. A valve 30' in line 30 may be used to regulate the pressure of the reaction mixture in the converter.

The heat generated by the reaction causes the mercury to boil. The hot mercury vapor surrounding the upper portions of tubes 25 serves to heat the vapor mixture passing down through the tubes and a portion of this vapor is thereby condensed and returns to the body of liquid mercury. The amount of heat generated is usually greater than can be condensed in this way, and accordingly a plurality of mercury vapor condensers 31 are provided. These consist preferably of vertical tubes which communicate with the interior of the vertical shell above the level of the liquid mercury and which are provided with extended surface in the form of fins as indicated, so as to cause the mercury vapor to be condensed by the circulation of air over the condensers. The condensed mercury vapor refluxes to the body of mercury in the converter at the same temperature as the liquid in a manner which is well understood.

The upper ends of reflux condensers 31 are interconnected by means of a header, not shown, so as to equalize the pressure and to this header a pressure-regulating means is connected by pipe 32 for the purpose of regulating the pressure of the mercury vapor within the converter. By varying this pressure the boiling point of the mercury may be changed, and the operating temperature of the converter thereby held at any desired value. The pressure-regulating apparatus consists of a container 33 of inert gas, such for example as carbon dioxide or nitrogen under pressure, and valves 34 and 35 and a gauge 36. By appropriately manipulating these valves the pressure on the mercury vapor within the converter, as indicated by gauge 36, may be adjusted to any desired value.

The converter 1 is preferably provided with a safety diaphragm 37 mounted in a relatively large opening into the upper chamber 23 so that in case the pressure of the reactive vapor mixture within the converter rises beyond a predetermined amount, as determined by the strength of diaphragm 37, this diaphragm will give way, thereby releasing the pressure and preventing damage to the converter. A check valve 38 is provided in air supply line 10 which is adapted to close upon a sudden and excessive increase in the rate of flow of air through the line, which would occur, for example, following the release of safety diaphragm 37. This prevents a sudden inrush of air into the vaporizer, which would carry over unvaporized naphthalene into the converter.

As explained above, the operating temperature of the converter varies between 375° C. and about 600° C. depending upon the condition of the catalyst. That is, the converter may be run for several months at an operating temperature of 375° C. Then it may be desirable to raise the operating temperature to 425° for example, and the converter may be run at this temperature for another period of weeks or months, it being customary to increase the operating temperature in such steps until an operating temperature of around 600° C. is reached. The reacted mixture of vapors and gases leaving the lower compartment 24 of the converter by line 30 is at a temperature which is not appreciably lower than the operating temperature. Consequently these gases are very hot, and in order to recover therefrom the desired partial oxidation product, they have to be cooled below the dew-point of that product in the mixture.

Prior to the present invention, these hot gases were cooled to some extent in passing through the pipe lines conducting them from the converter and then condensed by passing them into a condenser such as indicated at 39, which consists of a large elongated chamber or box preferably constructed of thin gauge metal and cooled by the atmosphere. The large surface of the condenser, together with the thinness of its metal walls which are adapted to conduct heat rapidly, serves to cool the mixture entering the condenser as quickly as possible. The vaporous mixture entering the condenser is condensed, in the case of phthalic anhydride, substantially directly from the vapor to the solid form, long needle-like crystals of phthalic anhydride collecting in the chamber. The vapors and gases which pass through the condenser 39 without being condensed escape through an outlet 40.

The control of the temperature of a large box-like condenser of the sort just described is a difficult problem, and prior to the present invention it was practically impossible to control its temperature with sufficient accuracy to secure an efficient condensation of the vapors entering the condenser. The temperature of the vaporous mixture entering the condenser was apt to shift widely, and as a result, operation had to be interrupted frequently to permit cleaning of plugged pipe lines or to remove caked phthalic anhydride which adhered to the condenser walls.

This tendency of the temperature of the condenser to fluctuate is due to a number of causes. The mere size of such a condenser makes its temperature control difficult. The temperature of the gaseous mixture leaving the converter is bound to fluctuate to some extent and this fluctuation in temperature therefore occurs in the gases entering the condenser.

The present invention obviates to a remarkable extent the difficulty in the control of the temperature of the condenser 39, and in accordance with the invention, the vaporous mixture leaving the converter is cooled to a regulated constant temperature just above the dew-point of the desired product (for example phthalic anhydride) before the mixture is delivered to condenser 39. This regulated or controlled cooling takes place in the vapor cooler 44. The reacted gaseous mixture enters the cooler through line 30 at the bottom and is conveyed from the top of the cooler through line 45 to condenser 39. If desired, however, line 30 may enter the cooler at the top, and line 45 may be connected at the bottom.

Vapor cooler 44 consists of a closed chamber shown as a steel shell, preferably cylindrical in cross-section, within which is a body of liquid 46 which partially fills the shell. The liquid, preferably water, may be supplied to the lower part of the shell through a pipe 47 by means of an injector 48. The level of the liquid is preferably maintained at about one-third of the distance from the top of the shell, and its height may be observed in the water gauge 49. While the control of the water level is shown in Fig. 2 as being accomplished by the manipulation of the injector 48, an automatic level control water feed may be provided in place of the injector if desired.

Means for bringing the hot vapors entering the cooler into heat exchanging relation with the body of water 46 and the vapor space above it are provided, and this means is shown in the drawing in the form of a coil of pipe 50 which extends substantially throughout the height of the shell so that a substantial portion of the area thereof will be exposed to the vapor space above the water level.

The passage of the hot vapors through coil 50 causes the water within the shell to boil and steam forms within the vapor space. The steam escapes from the top of the shell through a pipe 51 and may be used about the plant for any suitable purpose, thus constituting in effect a by-product of the phthalic anhydride manufacture. Placed in pipe 51 adjacent vapor cooler 44 is an adjustable automatic pressure-regulating valve 52 by means of which the pressure within the shell may be maintained constant at any desired value.

As shown in Fig. 2, this valve comprises a valve member 53 which is normally held against its seat by means of a spring 54 but which is held open against the pressure of the spring when the pressure within the shell exceeds a predetermined minimum value by means of a diaphragm 55 which is operatively connected to the valve stem, the chamber below the diaphragm being placed in communication with the interior of the shell by means of a small pipe 56. The operating pressure of the valve, that is, the pressure which will be automatically maintained within the vapor cooler by the valve, is determined by the tension of spring 54 and this is made adjustable by means of an adjusting screw 59. A safety valve 57 is preferably provided to relieve the pressure within the vapor cooler in case of an emergency, and a valved drain 58 is also preferably provided at the bottom of the vapor cooler.

The automatic pressure controlling valve 52 is adjusted so as to maintain a pressure within the vapor cooler corresponding to the temperature to which it is desired to cool the reacted gaseous mixture entering the condenser 39. Thus, assuming that the dew-point of the phthalic anhydride in this mixture is 120° C., the valve 52 will be set to maintain a pressure corresponding to approximately 3° above this dew-point, that is 123° C.

In heating and causing the vaporization of the water within the cooler 44, the gaseous mixture is cooled from the temperature at which it leaves the converter (assuming no drop in temperature in the line 30) to the temperature of the boiling point of the water in the cooler, that is, for the example above considered, to substantially 123° C. The area of the surface of coil 50 is sufficient to ensure that the vapor is cooled to this temperature before leaving the cooler by way of line 45. It is impossible for the vapor to be cooled below this temperature because the temperature of both the vapor phase and the liquid phase of the water within the vapor cooler are the same and it is impossible for them to differ so long as the liquid is boiling. Hence by means of this two-phase liquid vapor system within the vapor cooler, the gaseous mixture from the converter is cooled to a regulated constant temperature just above the dew-point of the phthalic anhydride in the mixture at which temperature it is delivered to the condenser 39. It is assumed that the line 45 is well lagged to prevent loss of heat and that whatever small drop in temperature occurs while the gaseous mixture travels throughout this line is taken into account and compensated for in the adjustment of valve 52 of the vapor cooler.

It sometimes happens that impurities of a tar-like nature and having a somewhat higher dew-point than the desired product, for example phthalic anhydride, are present in the vapor mixture and tend to condense in the vapor cooler and be carried forward in the gas stream into the condenser 39. In such cases, it may be desirable to include a separator for this condensate (not shown) in the line 45 between the vapor cooler and the condenser 39; and it may be preferable in such cases also to connect the pipe 30 to the top of the coil 50 and the pipe 45 to the bottom of said coil so that the flow of the vapor mixture through the vapor cooler will assist in draining the condensed impurities from the walls of the coil 50.

The gaseous mixture travels through coil 50 and line 30 at a comparatively high velocity whereby an efficient transfer of heat is effected both from the gaseous mixture to the middle of coil 50 and from the outer surface of coil 50 to the liquid 46. The gaseous mixture is cooled rapidly in passing through the cooler. Upon entering condenser 39 the velocity of the gaseous mixture immediately falls to an extremely low value thereby providing ideal conditions for the precipitation of the solid organic material from the gaseous mixture.

Inasmuch as the gaseous mixture enters the condenser 39 at a temperature just above the dew-point of the partially oxidized product therein, it is only necessary to cool the mixture a relatively slight amount in order to cause precipitation of the product to occur. This cooling is done by radiation from the condenser aided somewhat by the expansion of the vapors as they enter chamber 40.

Inasmuch as the reacted vapor mixture is cooled to a point just above the dew-point of the desired product and is prevented from cooling below this point through the operation of the two-phase liquid-vapor system cooler, the precipitation of solids in the lines 30 and 45 before entering the condenser 39 is effectively prevented.

Fluctuations in the temperature of the reacted vapor mixture leaving the converter, or a change in the operating temperature of the converter, have no effect upon the constant temperature within the condenser 39. These changes in temperature are all smoothed out within the vapor cooler 44, and their only effect is a variation in the amount of steam leaving the vapor cooler through line 51.

I claim:

1. In the oxidation of organic compounds in the vapor phase by a process which includes subjecting a vapor mixture of the organic compound and an oxidizing gas to an oxidizing action under suitable conditions of temperature control to produce a vaporous mixture containing a desired partial oxidation product of said compound, and recovering the said product from the vaporous mixture by condensation, the improvement which comprises subjecting the vaporous mixture, prior to the condensation, to a precooling whereby its temperature is adjusted to a controlled value above the dew-point of said mixture with respect to said product.

2. In the oxidation of organic compounds in the vapor phase by a process which includes subjecting a vapor mixture of the organic compound and an oxidizing gas to an oxidizing action at an elevated temperature under suitable conditions of temperature control to produce a vaporous mixture containing a desired partial oxidation product of said compound, and recovering the said product from the vaporous mixture by condensation, the improvement which comprises precooling the vaporous mixture, prior to the condensation, to a temperature just above its dew-point with respect to said product, and then subjecting the precooled vaporous mixture to condensation.

3. In the oxidation of organic compounds in the vapor phase by a process which includes subjecting a vapor mixture of the organic compound and an oxidizing gas to an oxidizing action under suitable conditions of temperature control to produce a vaporous mixture containing a desired partial oxidation product of said compound, and recovering the said product from the vaporous mixture by condensation, the improvement which comprises bringing the vaporous mixture, just prior to the condensation, into heat exchanging relation with the liquid phase of a two-phase liquid-vapor system, thereby causing precooling of the vaporous mixture and vaporization of the liquid in said system, the pressure of the vapor of said system being maintained at a constant value corresponding with a temperature just above the dew-point of the vaporous mixture with respect to said product, and thereafter subjecting said vaporous mixture to condensation.

4. In the recovery of a crystalline product from a hot vaporous mixture containing the same by cooling the vaporous mixture to produce condensation of said product, the improvement which comprises precooling said mixture to a controlled temperature above the dew-point of said mixture with respect to said product by bringing said mixture into heat exchanging relation with the liquid phase of a two-phase liquid-vapor system, while maintaining constant the pressure of the vapor of said system at a value corresponding with said temperature, and then subjecting the precooled mixture to condensation.

5. In the manufacture of phthalic anhydride by the vapor phase partial oxidation of naphthalene by a process which includes preparing a mixture of naphthalene vapor and air, subjecting said mixture to an oxidizing action at a temperature between 375° and 600° C. thereby producing a vaporous mixture containing phthalic anhydride, and recovering phthalic anhydride from the vaporous mixture by condensation, the improvement which comprises precooling said vaporous mixture to a regulated constant temperature of from 1° to 3° C. above the dew-point of said mixture with respect to the phthalic anhydride, and then immediately subjecting said precooled mixture to condensation.

6. In the recovery of a crystalline product from a hot vaporous mixture containing the same by cooling the vaporous mixture to produce condensation of said product, the improvement which comprises bringing a stream of said hot vaporous mixture just prior to the condensation, at relatively high velocity into indirect heat exchanging relation with the liquid phase of a two-phase liquid-vapor system, while maintaining contant the pressure of the vapor of said system at a value corresponding with a known temperature above the dew-point of said vaporous mixture with respect to said product, thereby causing precooling of said mixture and vaporization of the liquid in said system at a constant known pressure and temperature, and thereafter reducing the velocity of said stream and simultaneously cooling to produce condensation of said product.

7. Apparatus for the vapor phase partial oxidation of an organic compound comprising a reaction chamber, means for passing a reaction mixture in the vapor phase including an oxidizing gas through said chamber to produce a hot vaporous mixture containing partial oxidation products, a cooler connected to said chamber for reducing the temperature of said vaporous mixture to a regulated known temperature above its dew-point with respect to said products, said cooler comprising a chamber containing liquid in indirect heat transferring relation with said hot vaporous mixture, and having a vapor space in contact with said liquid, and means for controlling the pressure of the vapor in said vapor space, and a condenser connected to said cooler for condensing vapors contained in said vaporous mixture.

8. Catalytic apparatus for the vapor-phase partial oxidation of naphthalene to phthalic anhydride comprising a catalytic converter for partially oxidizing a mixture of naphthalene vapor and air to phthalic anhydride; a cooler connected to said converter for reducing the temperature of the reacted vapor mixture to a regulated temperature of 1° to 3° C. above the dew-point of said vapor mixture with respect to the phthalic anhydride in the mixture, said cooler comprising a chamber containing water in indirect heat transferring relation with said reacted vapor mixture and having a vapor space in contact with the water, and means for controlling the pressure of the vapor in said vapor space; and a condenser for phthalic anhydride connected to said cooler.

RIEWEN RIEGLER.